Nov. 9, 1926.　　　　　　　　　　　　　　　　1,606,129
G. A. PATTBERG
VARIABLE SPEED TRANSMISSION
Filed Feb. 19, 1925　　　3 Sheets-Sheet 2

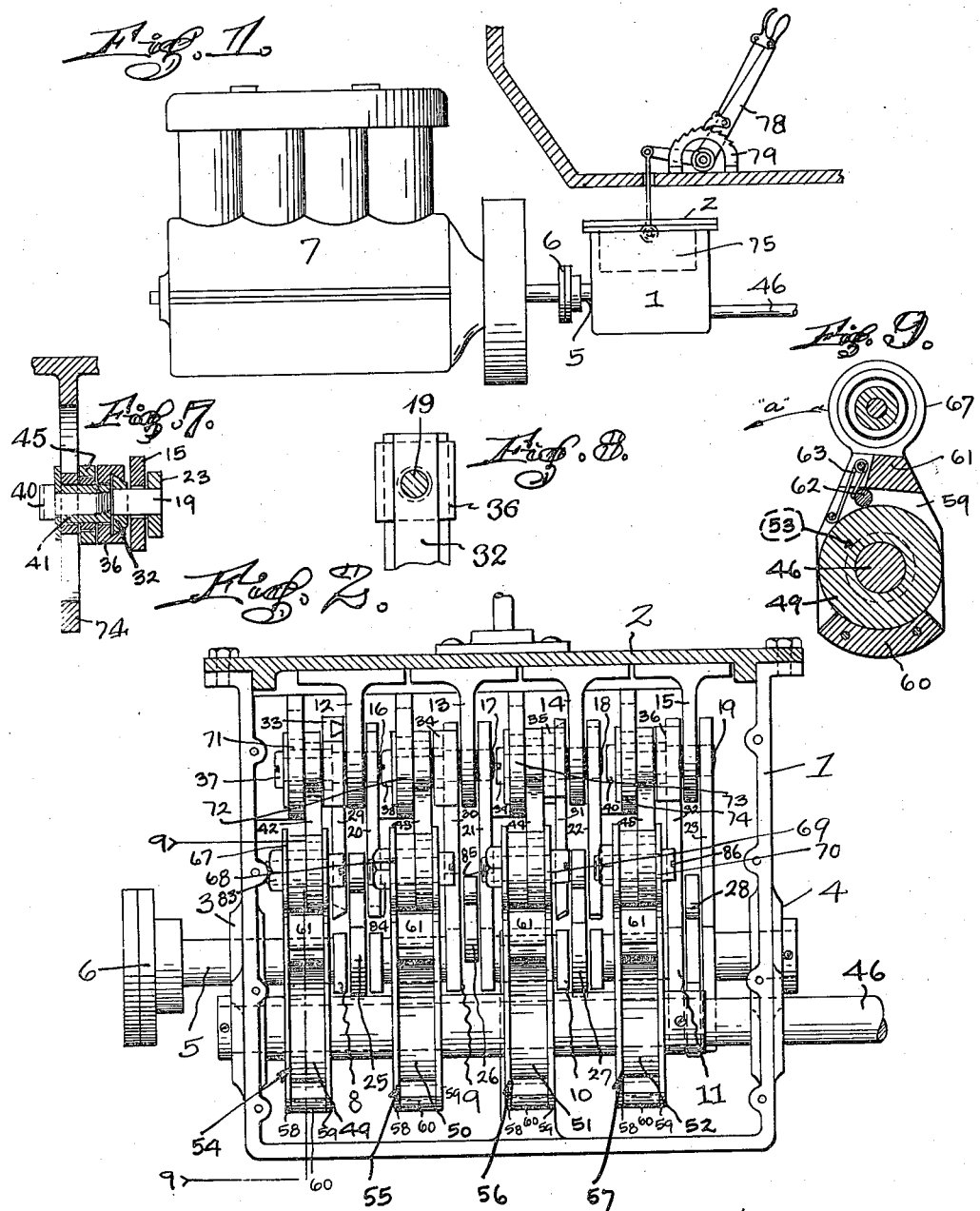

INVENTOR
George A. Pattberg
BY-ATTY
Lincoln Johnson

Nov. 9, 1926.　　　　　　　　　　　　　　　　　　1,606,129
G. A. PATTBERG
VARIABLE SPEED TRANSMISSION
Filed Feb. 19, 1925　　　3 Sheets-Sheet 3

INVENTOR
George A. Pattberg
BY—ATTY

Patented Nov. 9, 1926.

1,606,129

UNITED STATES PATENT OFFICE.

GEORGE A. PATTBERG, OF SAN LEANDRO, CALIFORNIA, ASSIGNOR, BY MESNE ASSIGNMENTS, TO VARIABLE SPEED GEARLESS TRANSMISSION CORPORATION, A CORPORATION OF NEVADA.

VARIABLE-SPEED TRANSMISSION.

Application filed February 19, 1925. Serial No. 10,235.

This invention relates particularly to a variable speed transmission to be interposed between a source of motive power and a unit to distribute said power.

An object of the invention is to provide a variable speed transmission which may be operatively joined to a power generating mechanism for the purpose of delivering power from said mechanism, at varying speeds, without the necessity of using change speed gearing to obtain the results desired.

A further object of the invention is to provide in combination a driving engine and a unit to be driven by said engine coupled together in operative relation by means of a variable speed transmission, said transmission being adapted to receive reciprocative power impulses from the driving engine and to transmit such power impulses to the driven unit to be transformed into rotary movement at the driven unit; means being provided in the transmission to regulate and control the duration of each reciprocative power impulse delivered to the driven unit to thereby govern the speed of the driven shaft in the driven unit.

Other objects of the invention are to provide a variable speed transmission that will be superior in point of simplicity, inexpensiveness of construction, positiveness of operation, and facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying three sheets of drawings—

Fig. 1 is a diagrammatic side elevation of a power engine having a transmission constructed in accordance with my invention applied thereto.

Fig. 2 is an elevation, from the front of a transmission constructed in accordance with my invention.

Fig. 7 is a plan section taken through Fig. 3 on the line 7—7.

Fig. 8 is a fragmentary elevation of a portion of Fig. 3 taken on the line 8—8.

Fig. 9 is a vertical cross section taken through Fig. 2 on the line 9—9.

Figure 3:
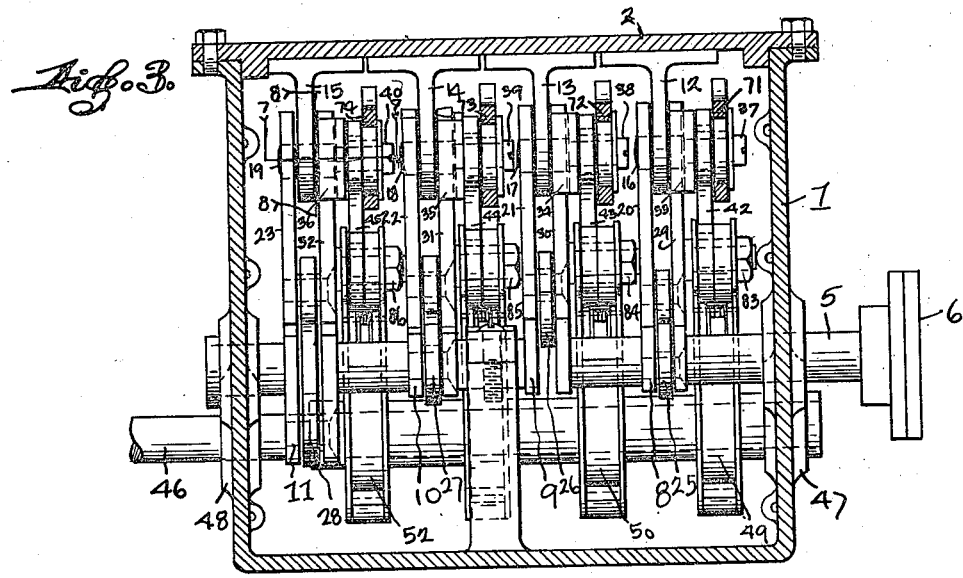
Fig. 3 is an elevation, from the rear, of Fig. 2.
Figure 4:
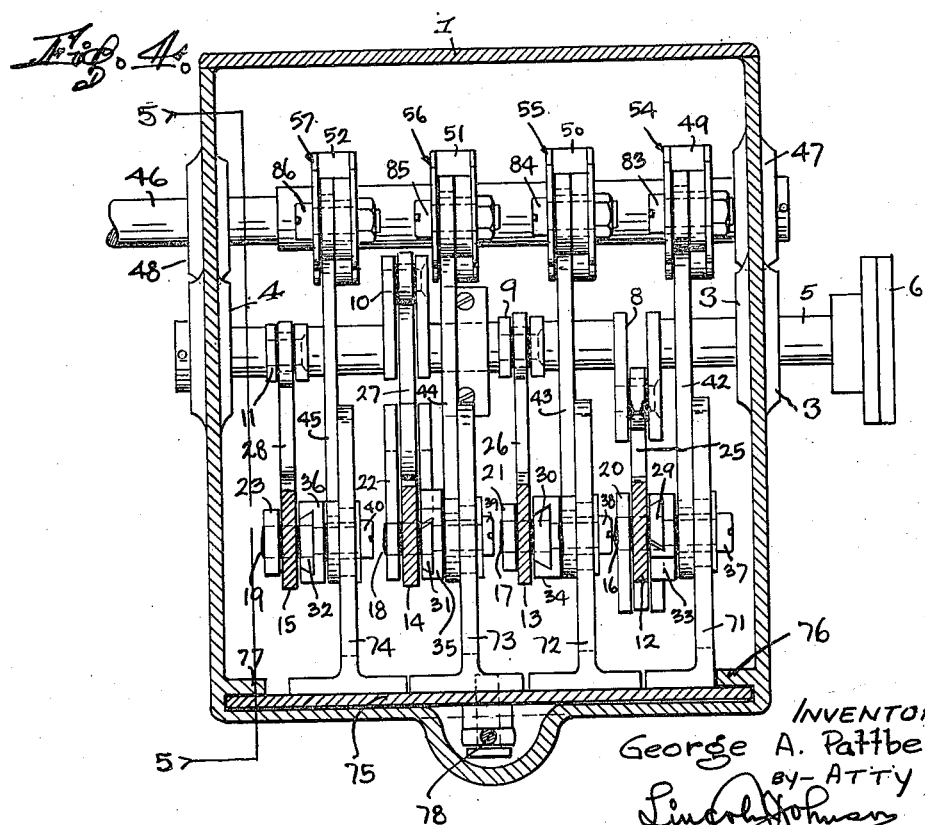
Fig. 4 is a plan view, from the top of Fig. 3.

The invention to be hereinafter described is a variable speed transmission which has a shaft therein secured to the driving shaft of any power unit. The transmission is built to function from reciprocative power impulses delivered from a power driving shaft and to transmit the reciprocative power impulses to a driven shaft. The speed of the driven shaft is controlled by regulation of the period of time during which each of the reciprocative power impulses will be applied to the driven shaft. In the present application I have shown four gripping members, each of which will grip the driven shaft, in sequence, to move the same throughout part of a complete revolution. The period of time which each gripping member will engage the driven shaft will control the length of arcuate turning movement that will be delivered to the driven shaft by each gripping member, and hence by controlling the length of the stroke of each gripping member, the driven shaft may be held in a non-revolving position, or rotated at any and all speeds between a "dead-stop" and that equal to or greater than the maximum speed of the driving engine. The system in my transmission of changing leverages to vary the length of stroke of the reciprocative power impulses to be delivered for driving purposes, is the secret of obtaining the vast range of driving speeds, between the minimum and maximum. By my transmission, power may be delivered at all times on a gradual, continual gradient, without "step-up" or "step-down" or any similar fluctuation from the "zero" speed to that of the maximum, whereas in a gear transmission, it is practically impossible to obtain the smoothness of driving torque, between "zero" and the maximum at any or all driving speeds.

In detail the construction illustrated in the drawings comprises a casing or housing 1 closed on its upper side by a cover 2. The casing 1 is provided with aligned bearings 3 and 4 on its opposite sides in which the opposite ends of a driving shaft 5 are rotatably journaled. The shaft 5 extends beyond one end of the casing and is provided with a coupling flange 6 thereon for joining the shaft 5 to a driving engine 7 or other source of motive power. Although I have shown the transmission joined in Fig. 1 to an internal combustion engine, it is to be understood that any other source of motive power might be substituted in lieu thereof. The driving shaft 5 is provided with a plurality of throws or eccentrics 8, 9, 10 and 11, thereon, each arranged at an angle of 90° to the other so as to give the proper balance to the shaft 5.

A plurality of brackets 12, 13, 14 and 15 are secured to the underside of the cover 2 in substantial registry with the respective crank throws 8, 9, 10 and 11. A plurality of pivot pins 16, 17, 18 and 19 are journaled in each of the respective brackets 12, 13, 14 and 15 and extend beyond both sides thereof. Bars 20, 21, 22 and 23 are fixedly secured on corresponding ends of the respective pivot pins 16, 17, 18 and 19. The free ends of each of the bars 20, 21, 22 and 23 are pivotally secured by the pins 24 to the ends of the respective connecting rods 25, 26, 27 and 28 which are rotatably connected, at their other ends, to the crank throw 8, 9, 10 and 11, respectively, on the crank shaft 5. Rotative movement of the shaft 5 will cause reciprocative movement of the connecting rods 25, 26, 27 and 28, which are eccentrically journaled on said shaft, and cause the respective bars 20, 21, 22 and 23 and the pivot pins 16, 17, 18 and 19 to swing in the supporting brackets 12, 13, 14 and 15.

The other ends of each of the pivot pins 16, 17, 18 and 19 have the guide bars 29, 30, 31 and 32 securely joined thereto in disaligned relation relative to the respective bars 20, 21, 22 and 23, on the opposite ends of the same pivot pins. The side edges of each of the guide bars 29, 30, 31 and 32 are tapered or "dove-tailed" to receive the slides 33, 34, 35 and 36 thereon. Each of the slides 33, 34, 35 and 36 are duplicates one of the other, and are threaded to receive the headed machine screws 37, 38, 39 and 40. Bushings 41 are fixed around each of the screws 37, 38, 39 and 40, and around said screws the links 42, 43, 44 and 45, respectively, are revolvably journaled. The other ends of the links are swivelly connected to gripping members, to be hereinafter described in detail.

A driven shaft 46 is journaled in bearings 47 and 48 formed in opposite ends of the casing 1. The driving shaft 5 and driven shaft 46 are journaled in the casing so that the axes of each of said shafts are parallel. The shaft 46 is provided with the annular "wheel-like" members 49, 50, 51 and 52 placed in position thereon corresponding to the position of the links 42, 43, 44 and 45. Each of the wheel members 49, 50, 51 and 52 have concentrically arranged, annular bearings 53 on the opposite side faces thereof. The bearings 53 on each of the members 49, 50, 51 and 52 are adapted to have the respective frames 54, 55, 56 and 57 journaled thereon. Each of the frames 54, 55, 56 and 57 consist of plates 58 and 59 joined together in spaced relation along the bottom edge thereof by the curved block 60, and joined, across the upper part thereof, by the wedge block 61. The spaced plates 58 and 59 are free to rotate on the annular bearings 53, provided on the opposite side faces of each of the members 49, 50, 51 and 52. The wedge block 61 in each of the frames 54, 55, 56 and 57 is spaced away from the upper periphery of the correlated annular members 49, 50, 51 and 52 and a roller 62 is operatively confined between each wedge block 61 and wheel periphery. A spring 63 is secured in each one of the frames 54, 55, 56 and 57 to hold each of the rollers 62 in registering engagement with the space between wedge and wheel periphery. When the frames 54, 55, 56 and 57 are moved in the direction of the arrow "a" in Fig. 9, each roller 62 is jammed between the wedge block 61 and periphery of the respective wheels 49, 50, 51 and 52 causing said wheels to move in the same direction as that of the frames 54, 55, 56 and 57. When the frames are moved in the opposite direction, the gripping rollers 62 are rendered inoperative and the driven shaft 46 is not moved. I have found that the action of the rollers 62 being confined by the wedge blocks 61 causes the said wedge blocks and frames to be slightly lifted and to raise the lower blocks 60 into contact with the under periphery of the wheel members 49, 50, 51 and 52. Thus the wheel members are frictionally gripped on different portions of their peripheries by the friction rollers 62 and blocks 60. The frictional contact between the parts named and the driven shaft is sufficient to prevent slippage and to afford a positive grip between the engaging parts.

Each of the frames 54, 55, 56 and 57 are provided with extended terminuses 67, 68, 69 and 70 in which the ends of the respective links 42, 43, 44 and 45 are pivotally connected by the pins 83, 84, 85 and 86. The links 42, 43, 44 and 45 are all of the same length and on account of the respective guide bars 29, 30, 31 and 32 being offset relative to each other, the frames 54, 55, 56 and 57 are caused to be offset relative to each other. Thus the swinging movement of the guide bars, 29, 30, 31 and 32 caused by the reciprocating connecting rods 25, 26, 27 and 28 causes the links 42, 43, 44 and 45 to be reciprocated in unison therewith and a rocking action imparted to the frames 54, 55, 56 and 57. The rocking action of the frames 54, 55, 56 and 57 through the gripping members, causes the driven shaft 46 to be moved in a common direction. The gripping members 60 and 62 in each of the respective frames 54, 55, 56 and 57 do not engage the driven shaft 46 at the same time but each grips the said shaft one after the other. Each of the frames 54, 55, 56 and 57 move throughout a predetermined arc relative to the driven shaft 46, and the said frames are caused to grip onto the said shaft throughout the arc of movement in one direction. By reason of each of the frame members being off-set, through connection to the actuating links and bars, operated by the driving shaft, it is obvious that only one frame will grip the driven shaft, and that the commencement of the gripping operation by one frame will take place immediately after the stopping of the gripping action by an adjacent frame, and said frames will continue to exert a gripping action on the shaft 46 in succession. The reciprocating power impulses would thus apply a steady rotative torque to the driven shaft 46.

Figure 5:
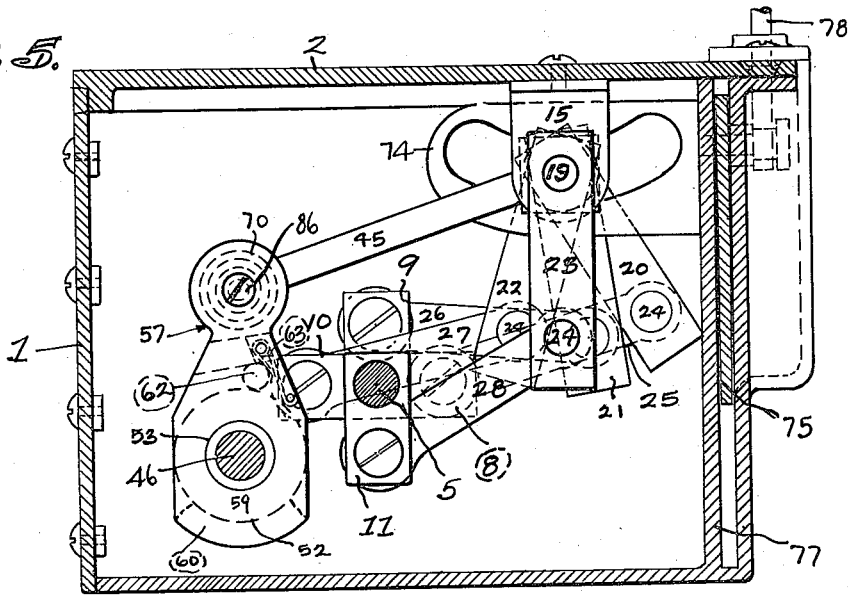
Fig. 5 is a vertical cross section taken through Fig. 4 on the line 5—5 showing the parts in the "neutral" or inoperative position.
Figure 6:
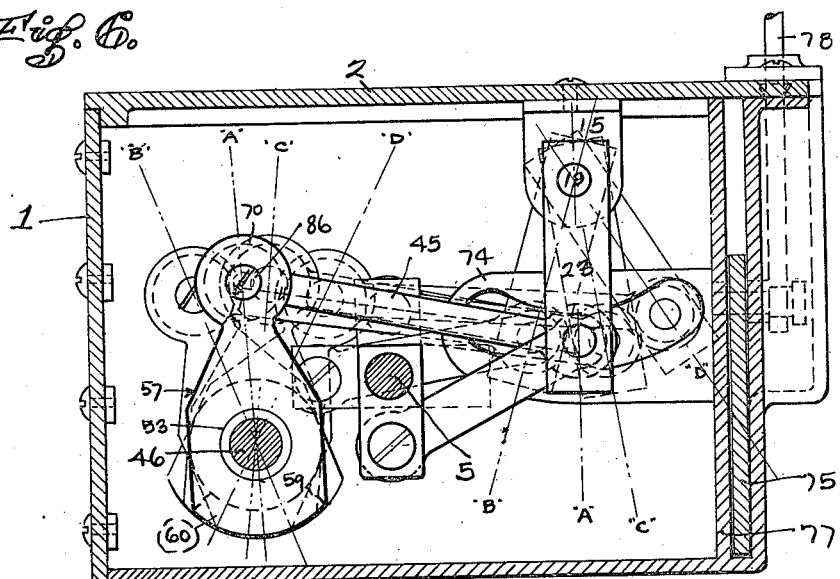
Fig. 6 is a cross section similar to Fig. 5 showing the parts in the high speed operating position.

In Fig. 5 I have shown the operative portions of the transmission in a neutral position, that is, all power is delivered from the drive shaft 5 through its reciprocating connecting rods and system of links and levers to the gripping frames, which are so positioned they cannot move relative to the driven shaft. In order to arrange the gripping members 54, 55, 56 and 57 in operative relation to each other and to the driven shaft, I have provided a plurality of slotted plates 71, 72, 73 and 74, each of which engages the respective slide pins 37, 38, 39 and 40. The slotted plates 71, 72, 73 and 74 are all fixedly secured to a plate 75 slidably guided in tracks 76 and 77 formed in one side of the interior of the casing 1. The slotted plates 71, 72, 73 and 74 engage the slide pins 37, 38, 39 and 40 and cause the slides 33, 34, 35 and 36 to be moved up or down on the guide bars 29, 30, 31 and 32. This movement of the slides on the guide bars, through the connecting links, causes the gripping members 54, 55, 56 and 57 to be placed in different positions relative to the driven shaft 46. In Fig. 6 I have shown the slotted plates 71, 72, 73 and 74 moved into the lowermost position, to give the maximum movement and spread to the gripping members. The position of the parts of the transmission, as shown in Fig. 6, is the high speed position, or that position at which the maximum speed is delivered through the gripping members to the driven shaft. I have shown in Fig. 6, the position of each of the gripping members 54, 55, 56 and 57 relative to the driven shaft when the extent of reciprocative movement will be the greatest and which also covers the period of time during which the gripping members will remain in contact with the driven shaft the longest. Hence by increasing or diminishing the period of rocking connection between the gripping members and the driven shaft, the power impulses to be delivered to the driven shaft are regulated and controlled. The plate 75, having the slotted guides 71, 72, 73 and 74 thereon is actuated by a single control lever 78, or other means suitably pivoted in relation to a notched quadrant 79 so as to maintain the mechanism speed control in any desired position.

Having thus described this invention, what I claim and desire to secure by Letters Patent is:—

1. A variable speed transmission comprising a casing; a drive shaft journaled in said casing having eccentrics thereon; a plurality of bars pivoted at one end thereof to said casing; rods pivotally connecting the drive shaft eccentrics to the free ends of each of the plurality of bars; guide members fixedly secured to each of the bar pivots; slides mounted on said guide members; a driven shaft journaled in said casing; a plurality of separate gripping members rotatably mounted on said shaft and adapted to move said shaft in a common direction; and links connecting corresponding slides and gripping members.

2. A variable speed transmission comprising a casing; a drive shaft journaled in said casing having eccentrics thereon; a plurality of bars pivoted at one end thereof to said casing; rods pivotally connecting the drive shaft eccentrics to the free ends of each of the plurality of bars; guide members fixedly secured to each of the bar pivots; slides mounted on said guide members; means to move the slides on the guide members; a driven shaft journaled in said casing; a plurality of separate gripping members rotatably mounted on said driven shaft to rotate the said shaft in a common direction; and links connecting corresponding slides and gripping members.

3. A variable speed transmission comprising a casing; a drive shaft journaled in said casing having eccentrics thereon; a plurality of bars pivoted at one end thereof to said casing; rods pivotally connecting the drive shaft eccentrics to the free ends of each of the plurality of bars; guide members fixedly secured to each of the bar pivots; slides mounted on said guide members; individual frames, having arcuate slots thereon to receive the slides, adjustably mounted in the casing; means to move the individual frames and slides; a driven shaft journaled in said casing; a plurality of separate gripping members rotatably mounted on said driven shaft to rotate the said shaft in a common direction; and links connecting corresponding slides and gripping members.

In testimony whereof, I have hereunto set my hand at San Francisco, California, this 13th day of February, 1925.

GEORGE A. PATTBERG.